United States Patent [19]
Ladd

[11] Patent Number: 6,142,654
[45] Date of Patent: Nov. 7, 2000

[54] VEHICLE HEADLAMP AIMING DEVICE

[75] Inventor: Scott E. Ladd, Strongsville, Ohio

[73] Assignee: Trans Technology Engineered Components, LLC, Brunswick, Ohio

[21] Appl. No.: 09/303,391

[22] Filed: May 1, 1999

[51] Int. Cl.[7] .................................................. B60Q 1/06
[52] U.S. Cl. ........................ 362/460; 248/551; 362/524; 362/423; 362/424; 362/523; 362/463; 74/89.13
[58] Field of Search ............................ 248/551; 362/524, 362/423, 424, 463; 74/89.13; 364/460, 523

[56] References Cited

U.S. PATENT DOCUMENTS

| | | | |
|---|---|---|---|
| 4,665,469 | 5/1987 | Furfari et al. | 362/66 |
| 4,796,494 | 1/1989 | Eckenrode et al. | 81/484 |
| 4,893,219 | 1/1990 | Lisak | 362/66 |
| 5,165,775 | 11/1992 | Lisak et al. | 362/66 |
| 5,186,531 | 2/1993 | Ryder et al. | 362/66 |
| 5,309,780 | 5/1994 | Schmitt | 74/89.13 |
| 5,351,170 | 9/1994 | Nagengast et al. | 362/66 |
| 5,398,173 | 3/1995 | Ellenberger | 362/66 |
| 5,508,896 | 4/1996 | Suehiro et al. | 362/66 |
| 5,775,795 | 7/1998 | Christian et al. | 362/66 |
| 6,017,137 | 1/2000 | Suehiro et al. | 362/289 |
| 6,042,254 | 4/2000 | Burton | 362/529 |
| 6,050,712 | 4/2000 | Burton | 362/529 |

Primary Examiner—Sandra O'Shea
Assistant Examiner—Anabel M. Ton
Attorney, Agent, or Firm—Vytas R. Matas

[57] ABSTRACT

An apparatus and method for providing evidence of tampering with a vehicle headlamp position adjusting assembly. An indicator 30 is designed to simply slip over a drive member 2. Protrusions 38 engage a groove 44 in an enlarged portion 42 of the drive member 2 on a vehicle headlamp adjusting assembly 100. Projections 36 at an upper edge angle inwardly and are constructed to snap or break off if engaged with a rim 52 on the drive member 2, if one attempts to remove apparatus 30 from the assembly 100.

15 Claims, 4 Drawing Sheets

VEHICLE HEADLAMP AIMING DEVICE

BACKGROUND OF THE INVENTION

1. Field of the Invention

The present invention relates in general to a vehicle headlamp aiming device, and more particularly to a device for adjusting the position of the headlight for use with a vehicle headlight adjusting assembly. The vehicle headlamp aiming device is positioned on the drive member of the vehicle headlight adjusting assembly and secured thereto. Portions will break if the device is removed from the drive member to indicate any tampering therewith. The present invention provides evidence that a headlight adjusting assembly has not been tampered with.

2. Description of the Related Art

Vehicular headlights have for many years been mounted on moveable frames to enable periodic adjustment of their position which is apt to change due to vibration and the like. Ideally, the headlights illuminate the road ahead in a suitable manner without focusing directly on oncoming vehicles which could possibly blind the opposing driver.

Although the headlight frame position has commonly been adjustable by means of straight screws threadingly engaged with a fixed frame and located so that upon rotation they operate to move the headlight and its frame upwardly and downwardly, or to the right and left as required, lately, due to more complex designs and more difficult accessibility, gear box assemblies have been recently employed to provide for rotatable input drive member and an output adjusting screw that are either horizontally or angularly oriented with respect to each other.

One such example is disclosed and described in U.S. Pat. No. 4,665,469 which is assigned to the Assignee of the present invention, and hereby incorporated by reference. Other examples of these gearbox assemblies are described in U.S. Pat. Nos. 4,893,219; 5,165,775; 5,398,173; and 5,508,896. These patents are also incorporated herein by reference.

In addition to the above patents, some of the headlight position adjusting assemblies have been designed to prevent the output adjustment member from rotating while traversing in opposite axial directions in response to the rotation of the input drive member in opposite directions. Example of these devices are described in U.S. Pat. Nos. 4,796,494; 5,186,531; 5,309,780; and 5,351,170.

U.S. Pat. No. 5,775,795 describes a vehicular headlight adjusting assembly that is operative to cause an adjusting member operatively connected to the headlight frame to traverse without rotation in opposite axial directions and move the frame in response to rotation of the angularly oriented input drive member. This patent is assigned to the Assignee of the present invention and hereby incorporated by reference.

The law requires a device to indicate when a headlight adjustment assembly has been re-adjusted or tampered with. Usually, the input drive member for a headlight gear box position adjusting assembly is fixed in place to prevent unauthorized tampering or movement after the headlights have been adjusted. Some prior art methods for (locking) the input drive member have included simply gluing the input drive member with a hot melt glue gun, for example, or and/or placing some type of covering device over the input drive member in an attempt to fix it in that position. The disadvantage of attempting to glue the member is that it requires a primer so that the glue adheres.

There still exists a need for a device that can be used to fix the input drive member in position. Such a device would indicate whether or not the input drive member was moved since the initial adjustment. This device preferably would be removable, but would have indicators revealing that it had been removed. Preferably, such a device would further include markings thereon to show on a calibrated scale the amount of movement or adjustment made. Also, the device should easily be installed by simply "snapping" it on.

BRIEF SUMMARY OF THE INVENTION

The present invention is directed to solving the aforementioned problems as well as others by providing an apparatus that provides evidence of tampering with a vehicle headlamp position adjusting assembly. In accordance with the present invention, an indicator preferably substantially cylindrical in form with a flange is constructed to be positioned over the drive member of the vehicle headlamp position adjusting assembly. A plurality of protrusions at the bottom end of the indicator are constructed to engage a groove in the drive member. The opposite end of the indicator has a flange and includes a plurality of finger like projections which are angled towards the drive member and are constructed to be positioned below a rim on the drive member. In the preferred embodiment, the flange includes marks such as arrows or graduations designating positions for initial adjustment. Also, a plurality of slots are positioned axially on the indicator at the end with the protrusions. After the vehicle headlamp position adjusting assembly is set to the desired location, the apparatus according to the present invention is simply snapped on over the drive member. Any attempts to remove the indicator will cause the projections to break off therefrom and evidence tampering with the vehicle headlamp position adjusting assembly.

Accordingly, an object of the present invention is to provide an apparatus that evidences any tampering with a vehicle headlamp position adjusting assembly.

Another object of the present invention is to provide a method which reveals any tampering with the vehicle headlamp position adjusting assembly.

Still another object of the present invention is to provide an indicator for a vehicle position adjusting assembly that is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is described and illustrated.

DETAILED DESCRIPTION OF THE INVENTION

Figure 1:
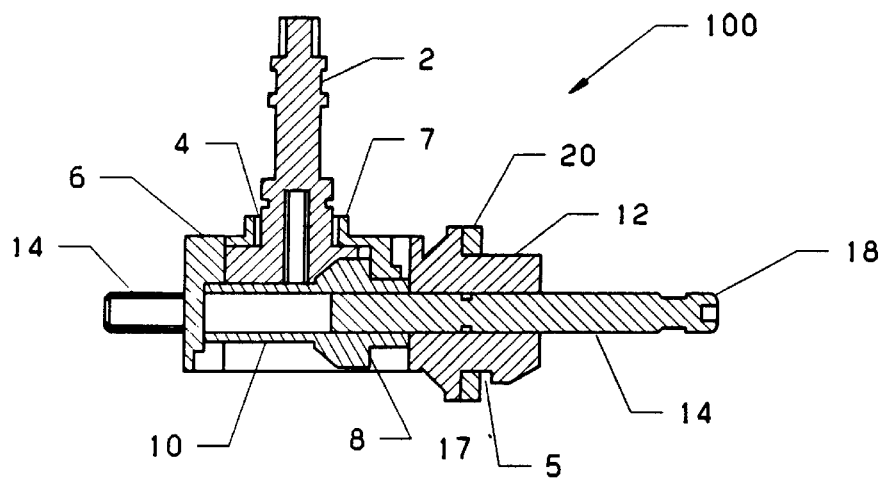
FIG. 1 is a cross sectional side elevation view of one prior art vehicle adjusting assembly.

Referring to the Figures where like numerals designate like or similar features throughout the several views, and first to FIG. 1, there is shown a vehicle headlamp adjusting assembly generally designated 100. The assembly includes drive member 2 that is integral with a drive gear 4. Drive gear 4 has teeth (not referenced) that intermesh with teeth of a driven gear 8 for advancement or retraction of an adjusting member 14. Driven gear 8 has an integral tubular section 10 for accommodating movement of adjusting member 14. Tubular section 10 has an inner surface that is threaded. Adjusting member 14 includes external threads 16 that threadingly engage with the internal threads in the tubular section 10 of driven gear 8. Adjusting member 14 has one end configured like a spherical ball referenced by numeral 18 that is adapted to engage a socket in a moveable frame upon which the headlight or headlamp is mounted to provide a pivotable ball-and-socket-type connection therebetween well known in this art.

In this assembly, adjusting member 14 is disposed in angular relationship and preferably transverse relationship to drive member 2 such that rotation of drive member 2 in opposite directions cause drive gear 4 to rotate driven gear 8 which ordinarily would cause adjusting member 14 to traverse in opposite axial directions through housing 6. A six-lug external protrusion 24 at the end of drive member 2 is adapted to interfere or to receive a six-lug socket type tool by which to enhance rotation of drive member 2.

Figure 2:
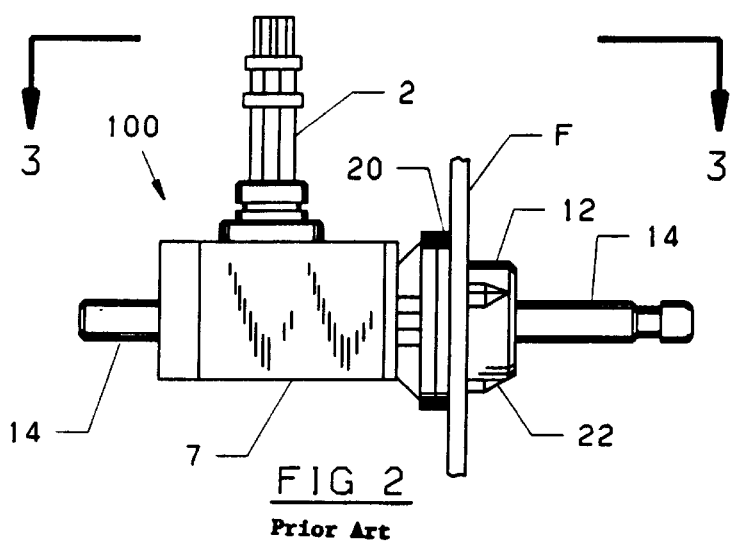
FIG. 2 is a side elevation view of a prior art adjusting assembly contained within a housing.
Figure 3:
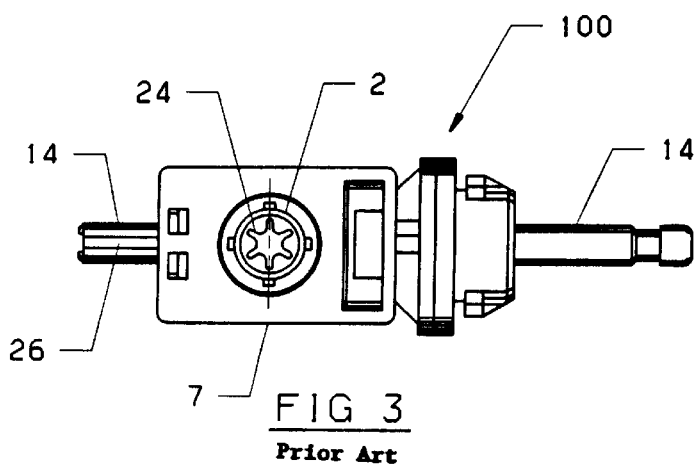
FIG. 3 is a top elevation view of a prior art adjusting assembly taken along view line 3—3 in FIG. 2.

As depicted in FIGS. 1–3, the drive gear 4 and driven gear 8 are in substantial transverse relationship to each other and both are mounted for rotation in the housing 7. Housing 7 includes means at one end for securing assembly 100 to a fixed frame F in the form of a tubular hub 12 that is insertable through an opening in frame F. Hub 12 has a plurality of circumferentially spaced-apart lug like protrusions 22 disposed outwardly of an annular slot 5 in hub 12 that are employed to register with and pass through corresponding slots.

Vehicle adjusting assembly 100 includes an axial extending groove referenced by numeral 26 with a web separating the grooves. The vehicular adjusting assembly 100 is described in detail in U.S. Pat. No. 5,775,795 which is hereby incorporated by reference. The foregoing description of the vehicle headlamp adjusting assembly 100 is intended to describe a preferred vehicle headlamp adjusting assembly for the present invention. Of course, the apparatus of the present invention is not intended to be limited merely thereto. The apparatus of the present invention is equally applicable to any type of vehicular headlamp adjusting device which uses a drive member for making the adjustments.

Figure 6:
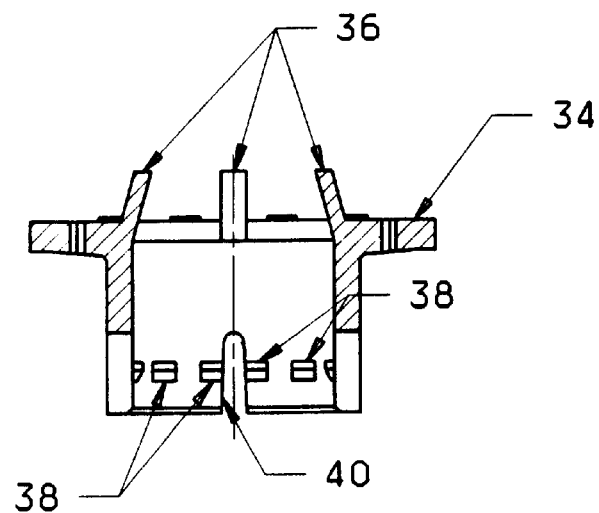
FIG. 6 is a sectional view taken along view line 6—6 from FIG. 5.
Figure 4:
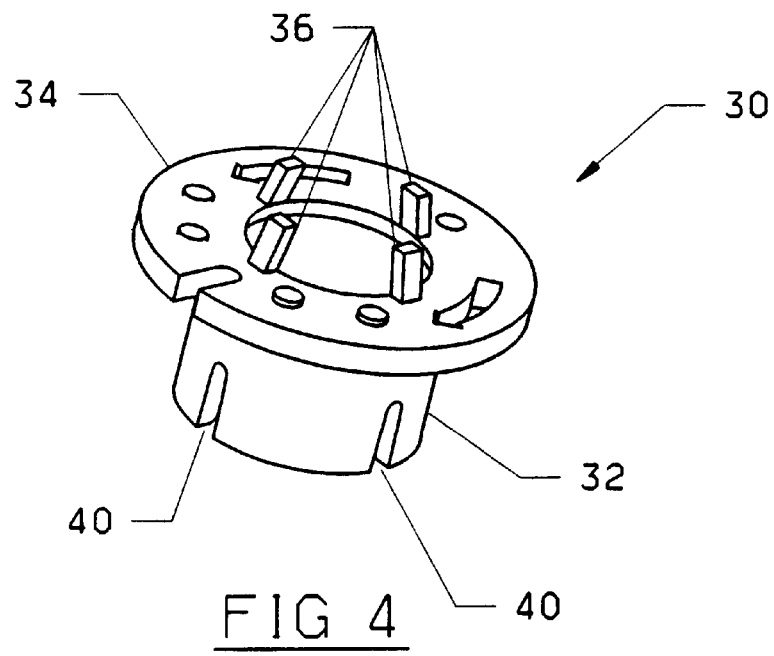
FIG. 4 is an elevated perspective view of the apparatus according to the present invention.
Figure 5:
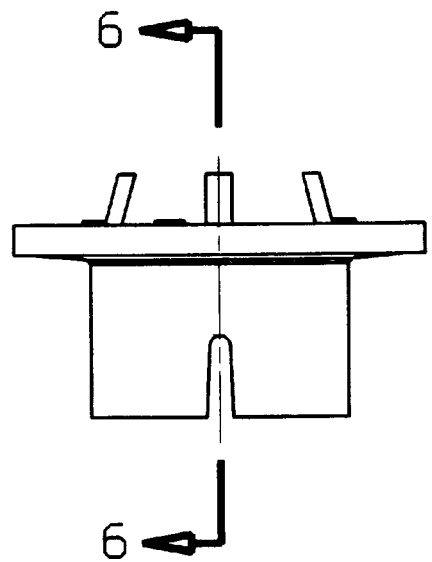
FIG. 5 is an elevated side view of the apparatus according to the present invention.
Figure 7:
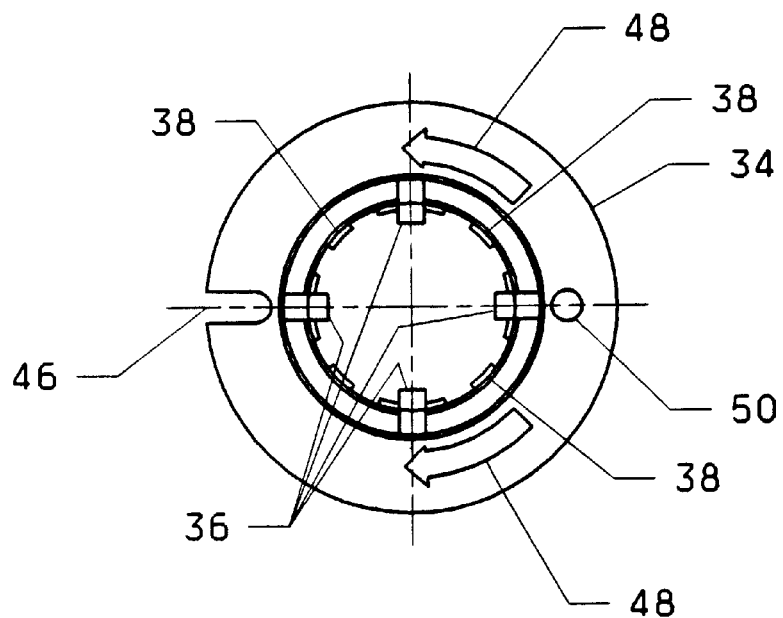
FIG. 7 is a top view of the apparatus according to the present invention.
Figure 8:
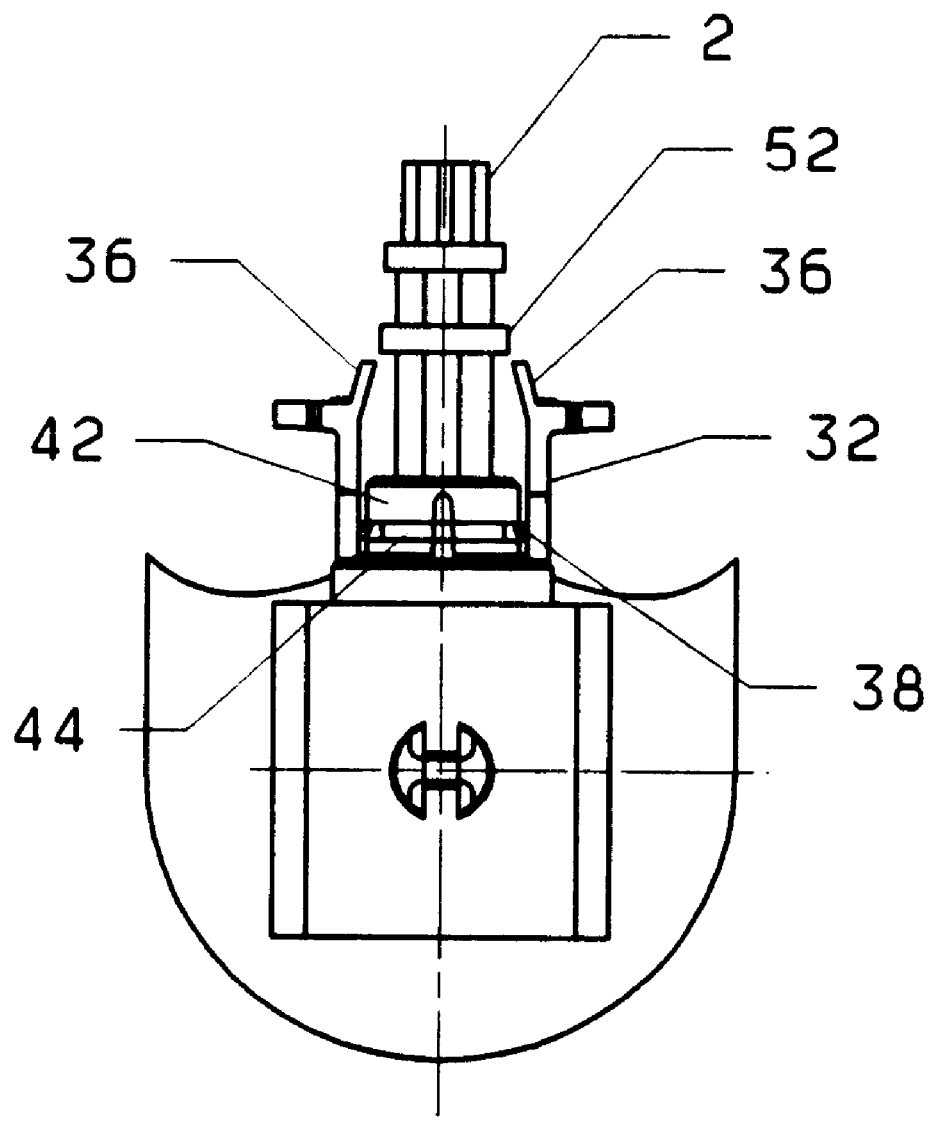
FIG. 8 is a rear view of a headlight adjusting assembly with a sectional view of the present invention thereon.

Referring next to FIG. 4, there is shown the apparatus generally designated 30 according to the present invention. Preferably, the apparatus comprises a vehicle headlamp aiming device or indicator 30 which has a body 32, that is preferably substantially cylindrical. The body 32 has one end that terminates in a flange 34. The end of the body 32 with flange 34 further includes a plurality of projections 36 formed on the edge thereof that are preferably angled inwardly. In the preferred embodiment, there are four projections 36 arranged about the edge of the body 32 to form quadrants thereon as shown in FIG. 7. The other end of the body 32 includes a plurality of protrusions 38 on an inner surface thereof that are spaced apart circumferentially as best seen in FIG. 6. Protrusions 38 are preferably lug like in construction with the upper surface (side closest to projections 36) being substantially horizontal while the lower side is angled to facilitate positioning indicator 30 so that protrusions 38 mesh with preferably a groove on drive member 2 adjacent the top of housing 7. Preferably the drive member 2 has a semi-circular groove 44 on each side thereof for accommodating protrusions 38 and mesh therewith. A plurality of slots 40 spaced apart and axially extending are positioned in indicator 30 preferably at the end with the protrusions 38 to facilitate positioning indicator 30 over an enlarged portion 42 of drive member 2. Enlarged portion 42 of drive member 2 as mentioned earlier preferably contains a semi-circular groove 44 for receiving and engaging protrusions 38 as best seen in FIG. 8.

In the preferred embodiment, axial slots 40 are also arranged to form quadrants at that end of the body 32. Also, preferably flange 34 includes markings such as a notch 46 and/or arrows 48 which may even be apertures in the shape of arrows or other openings 50 or even numerical markings thereon for setting a preferred adjustment of the headlamp and noting it as such. As an example, vehicle headlamp aiming device 30 in FIG. 7 would include a number 0.38 on flange 34 between arrow 48 and opening 50. This means that ½ turn of the device 30 changes the aim movement angle of the headlamp 0.38 degrees.

In applying the apparatus of the present invention, an operator adjusts with the drive member 2 a headlamp, in this case particularly a horizontal adjustment, but the present invention is also applicable to the vertical adjustment as well, to a desired location. After adjustment has been made, the apparatus 30 according to the present invention is simply slid over the drive member as shown in FIG. 8 until the protrusions 38 engage groove 44 on the drive member. Projections 36 are constructed preferably at an angle inclined toward the drive member and of a length that allows the indicator to slide over the drive member 2 so that the ends of the projections are positioned below rim 52 on drive member 2.

Any attempt to remove device 30 by sliding it off from the drive member 2 will cause projections 36 to snap or break off when they impact on rim 52. Thus, there is evidence of tampering with the headlamp adjusting assembly.

Preferably, the vehicle headlamp aiming device 30 according to the present invention is made of a plastic material such as an acrylonitrile-butadiene styrene (ABS) material. Of course, device 30 may be constructed of any plastic material or even a metal material that still provides the flexibility features of projections 36 to be sheared or broken when someone attempts to remove the device.

While specific embodiments of the invention have been shown and described in detail to illustrate the application of the principles of the invention, it will be understood that the invention may be embodied otherwise without departing from such principles.

I claim:

1. An apparatus for providing evidence of tampering of a vehicle headlamp position adjusting assembly, comprising:

an indicator, said indicator having a body and being constructed to be positioned on a drive member of a vehicle headlamp position adjusting assembly, one end of said body having a plurality of protrusions on an inner surface thereof, said protrusions being constructed to mesh with and engage the drive member, an opposite end of said body having a plurality of finger-like projections constructed to be positioned over a rim on the drive member and to be broken thereby upon removal.

2. An apparatus as recited in claim 1, wherein said body is substantially cylindrical and includes a flange at the end with said projections.

3. An apparatus as recited in claim 2, wherein said flange further comprises marks thereon to show a degree of adjustment.

4. An apparatus as recited in claim 2, wherein said flange further comprises at least one notch therein for pointing to a set adjustment.

5. An apparatus as recited in claim 2, further comprising a plurality of slots situated axially and spaced circumferentially on said body.

6. An apparatus as recited in claim 5, wherein said slots comprise four slots arranged to form quadrants on a lower portion of said body on the end with said protrusions.

7. An apparatus as recited in claim 2, wherein said projections comprise four projections arranged to form quadrants.

8. An apparatus as recited in claim 7, wherein said projections are disposed at an angle pointing towards the drive member.

9. An apparatus as recited in claim 3, wherein said flange further comprises a pair of arrow shaped apertures thereon showing direction of rotation.

10. A method for revealing any tampering with a vehicle headlamp position adjusting assembly, comprising the steps of:

providing a vehicle headlamp position adjusting assembly, the vehicle headlamp position adjusting assembly having a drive member;

providing an indicator, the indicator having a body being substantially cylindrical with a plurality of protrusions at one end and a plurality of projections on an inner surface at the other end;

placing the indicator over the drive member;

engaging the protrusions with a mating groove on the drive member; and locking the indicator on the drive member by positioning the indicator down on the drive member until the projections are situated below a rim on the drive member.

11. A method as recited in claim 10, further comprising the step of providing the indicator with a flange, the flange having at least one notch therein for indicating position.

12. A method as recited in claim 11, further comprising the step of positioning a plurality of axially disposed slots on the end of the indicator having the protrusions.

13. A method as recited in claim 12, further comprising the step of arranging the slots to form quadrants on the end of the indicator having the protrusions.

14. A method as recited in claim 13, further comprising the step of arranging the projections to form quadrants at the end with the flange.

15. A method as recited in claim 14, further comprising the step of angling the projections towards the drive member.

* * * * *